No. 892,176. PATENTED JUNE 30, 1908.
J. MORAVEC.
LOG PEELING MACHINE.
APPLICATION FILED SEPT. 9, 1903.

3 SHEETS—SHEET 1.

Witnesses: Inventor:
Florence Mapes Patrick John Moravec
F. H. Schott By Morgii Massie
His Attorneys

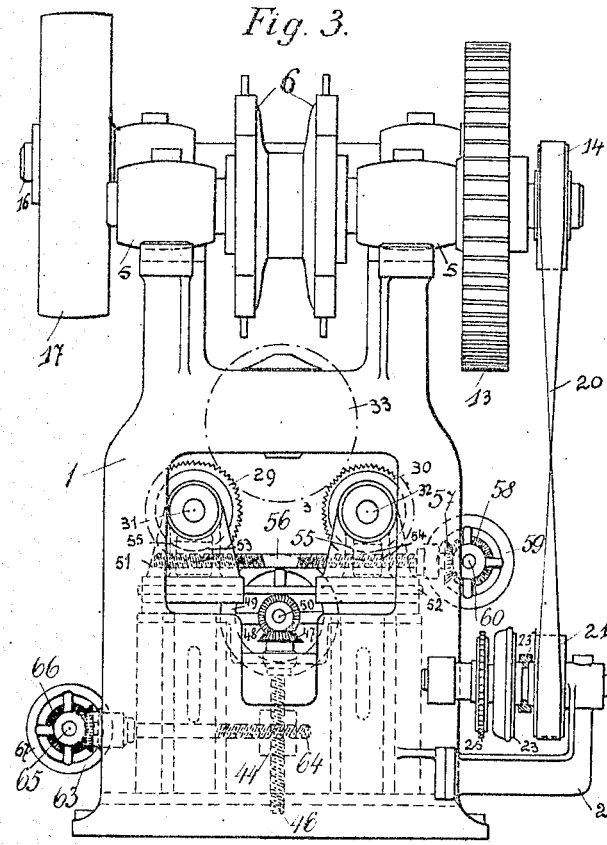

No. 892,176. PATENTED JUNE 30, 1908.
J. MORAVEC.
LOG PEELING MACHINE.
APPLICATION FILED SEPT. 9, 1903.

3 SHEETS—SHEET 3.

Witnesses:
F. H. Schott
Florence Mapes Patrick

Inventor:
John Moravec
by George M Massie
His Attorneys

UNITED STATES PATENT OFFICE.

JOHN MORAVEC, OF DUNDAS, ONTARIO, CANADA.

LOG-PEELING MACHINE.

No. 892,176.　　　　Specification of Letters Patent.　　　Patented June 30, 1908.

Application filed September 9, 1903. Serial No. 172,535.

*To all whom it may concern:*

Be it known that I, JOHN MORAVEC, a citizen of Austria-Hungary, residing at Dundas, Ontario, Canada, have invented certain new and useful Improvements in Log-Peeling Machines; and I do hereby declare the following to be a full, clear, and exact description of the invention, such as will enable others skilled in the art to which it appertains to make and use the same.

This invention relates to a log peeling machine in which a rotating log is peeled or ground by means of knives, said knives being attached to a chain and running in a longitudinal direction relative to the log. Chain, knives and log are displaceable in all directions, so that logs of varying diameter and degree of hardness can be peeled throughout the entire day without interruption.

The disadvantages common to most log peeling machines in general use are obviated in the present invention in that the machine is arranged to operate on logs of any desired length; it can be used for large and heavy logs of any hardness by means of adjusting devices; the machine can work an entire day by reason of suitable adjustment of the knives and of the logs without any interruption to the movement, and the knives can be adjusted to suit any depth of the bark.

In the accompanying drawings the invention is exemplified in a preferred form of embodiment, with modifications.

Figure 1:
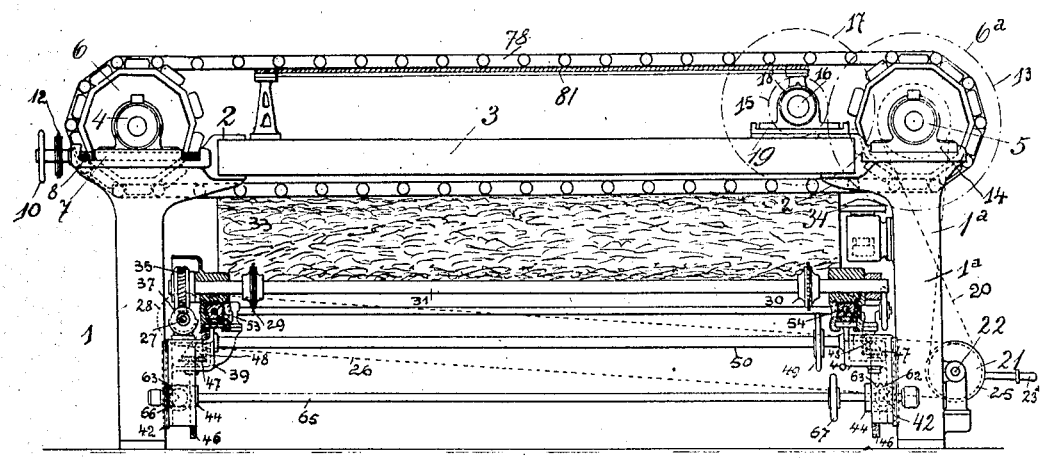
Figure 2:
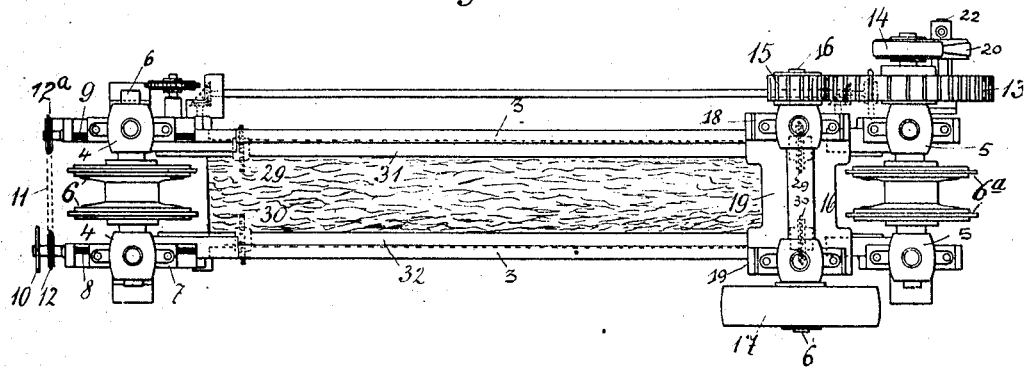

In these drawings Figure 1 is a side elevation; Fig. 2, plan view; Fig. 3, an end view on an enlarged scale; Fig. 4, the driving and adjusting arrangement of the toothed disk for the revolving of the log; Figs. 5 and 6, on an enlarged scale, details of the adjustment and operating mechanism; Figs. 7, 8, 9, 10 and 11 show details of the chain and the chain knives; and Figs. 12 and 13, the arrangement and manner of operation of toothed disks.

The machine is mounted on two standards, 1, 1ª, which are combined by means of two rails, 3, which are fastened to the two projections, 2. The upper ends or heads of the standards are enlarged, and carry the bearings, 4 and 5, for the shafts of the chain wheels, 6 and 6ª. The rear bearings, 5, are secured tightly upon the heads of the standards, 1ª, whereas the front bearing, 4, is arranged in longitudinal slots in which it is movable, in order to allow of a longitudinal displacement. For this purpose the base plates, 7, of the bearing, 4, are provided with nuts, in which the screw stems, 8 and 9, are placed. On the outer end, one of the stems, 8, carries the hand wheel, 10. For the simultaneous movement of both stems, chain wheels, 12 and 12ª, which are connected with each other by means of a chain, 11, are provided. In this manner, by turning the hand wheel, 10, both bearings, and also, the chain wheels, 6, are simultaneously moved in a direction longitudinally of the screw stems, whereby the knife chain which rests upon the wheels, 6, 6ª, is adjusted. On the same shaft with the vertical chain wheel, 6ª, the tooth wheel, 13, and the belt pulley, 14, are located. The first is in gear with the tooth wheel, 15, which is located on the shaft, 16, said shaft carrying on its opposite side the belt pulley, 17. The bearings, 18, for this shaft are secured upon the bearing plate, 19, and the latter upon the connecting rail, 3. Proceeding from the former belt pulley, 14, is a crossed belt, 20 (Fig. 3) which is located on the belt pulley, 21, arranged in the lower 80 part of the standard. Said pulley, 21, is mounted upon the same shaft, 22, with a tooth or friction clutch, or bearing, 23. The shaft 22 is in part located in a bearing arm, 24, which is fastened to the standard, and in part in the standard itself, and carries, together with the friction clutch, 23, a chain wheel, 25, which is connected by means of a chain, 26, (shown in dotted lines in Figs. 1, 5 and 6) with a chain wheel, 28, carried by the shaft, 27, and which serves for operating the shafts, 31, 32, carrying the disks, 29 and 30.

The disks, 29 and 30, which on their periphery are provided with sharp teeth, carry and rotate the log or any material which is to be worked or ground, as illustrated at 33. This log is fixed against displacement in a longitudinal direction and held in place for the purpose of more easily rotating the same by a friction disk, 34, which is firmly positioned on the standard. The motion is transmitted from the chain wheel, 28, to the shafts, 31, 32, carrying the toothed disks, 29 and 30, by means of the worm, 37 and 38, carried by the shaft, 27, and the worm wheels, 35 and 36, which are tightly connected with the shafts of the disks. Fig. 4. The friction coupling, 23, carried by the transmission shaft, 22, and which is operated by the lever, 23ª, admits of occasional adjustment or disengagement of the movement.

Figure 12:
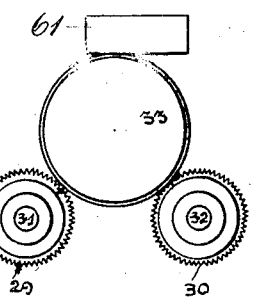
Figure 13:
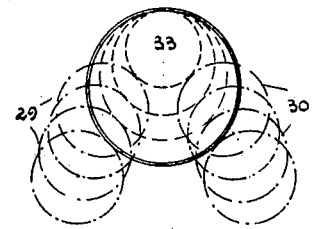

In order to make the toothed disks, 29 and 30, useful for logs of varying diameters, the same are displaceable as to their height as well as to their distance apart (Figs. 12 and 13). For this purpose the shafts, 31, 32, of the disks, 29 and 30, and their respective operating parts, 35, 36, 37, 38, are located at each end on brackets, 39 and 40, which are provided with vertical ribs, 41, and slots 43.

In the plate, 42, a projection 44, is provided which runs through the vertical slot, 45, in the middle inside of the support and extends beyond this. This projection carries screw threads in which operates a screw standard, 46, its upper end being journaled in the bracket, 39, the same carrying a bevel wheel, 47. With this bevel wheel, 47, gears the bevel wheel, 48, which is located on the longitudinal shaft, 50, said shaft being provided with a hand wheel, 49. On the other end of this shaft a bevel wheel is also fixed, which gears with mechanism similar to that just described, so that when turning the hand wheel, 49, the bevel gears, 47 and 48, engage and operate the screw shafts 46 and the shafts, 31 and 32, and the tooth disks, 29 and 30, which are fixed upon these shafts, move upwardly. In order to bring about the lateral adjustment of the toothed disks, 29 and 30, that is to say, their shafts, 31 and 32, which lie opposite to each other, to a proportionate extent and simultaneously, the bearings, 51 and 52, of the shafts, 31, 32, are provided with nuts, 53, 54, having oppositely disposed screw threads. These are arranged within slots, 55, of the bearings, and carry a screw spindle, 56, provided with right hand and left hand screw threads, the said spindle carrying at its end a bevel gear, 57, which engages with a bevel gear, 58. The latter is mounted on a longitudinal shaft, 60, which carries a hand wheel, 59. On the other end of the shaft, 60, there is also a bevel gear which operates in a manner analogous to the ones situated on the opposite side. If the hand wheel, 59, is rotated, then by means of the bevel gear wheels, 58, on both ends, the bevel gear wheels, 57, of the screw standard, are also rotated, whereby the bearings and the shafts, together with the toothed disks, are correspondingly moved.

Finally, if the necessity should arise to shift the log, 33, in a lateral direction in order to bring into use the edge of the knife, 61, which has remained sharp, (Fig. 12) and to avoid the sharpening or exchange of the knives as long as possible, on the lower inner side of the standard there is provided a projection, 62, forming a nut, in which operates a screw spindle, 64, located in the plate, 42, and provided on its end with a bevel gear wheel, 63. With the bevel gear, 63, the bevel gear wheel, 66, which is located on the longitudinal shaft, 65, is in engagement. The longitudinal shaft which carries the hand wheel, 67, has on its opposite side a similar bevel gear wheel which again operates in a manner analogous to the ones provided on the other support, 40, so that when turning the hand wheel, 67, the shaft, 65, is rotated, and also the plates and those parts which are carried by the same, such, for instance, as the bracket and the driving mechanism for the toothed disks, and the log which is held by the latter is displaced in a lateral direction. Since the knives are mostly tangential, that is to say, they work with a limited portion of the surface, this displacing arrangement permits of the use of the knives over the entire sharpened edge so that together with the adjustment of the knives, which will be later described, the period of effective working of the knives is very advantageously increased.

Figure 7:
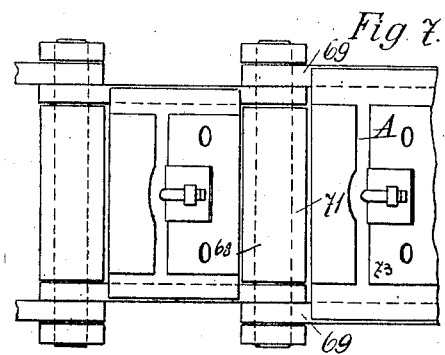
Figure 8:
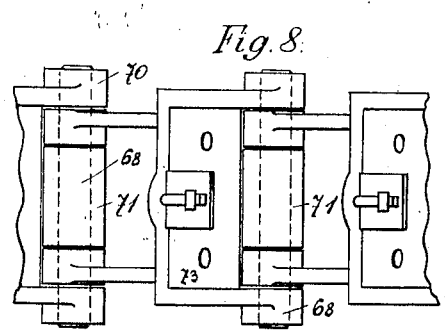
Figure 9:
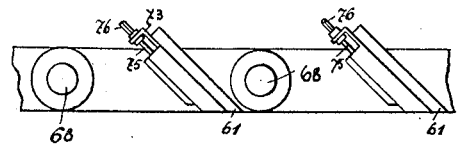
Figure 10:
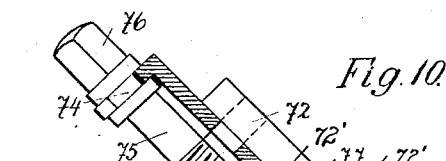
Figure 11:
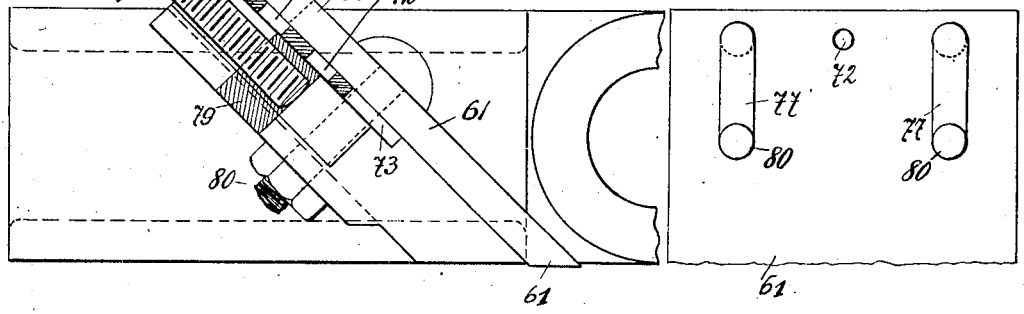

The knife chain, 78, Figs. 1, 7 to 11, consists of link members connected by bolts, 68, in a pivotal manner, the said members carrying the knives, 61. Figs. 7 and 8 show two different modifications of the chains, one, that shown in Fig. 7, showing side pieces, 69, through which pass the bolts 68 secured on both sides by screw nuts, whereas in Fig. 8 each member has on both sides perforated projections, 70, through which the bolts, 68, are passed, said bolts being provided at their ends with suitable provisions for holding the same in place. In both cases, rollers, 71, are provided which rest on the bolts, 68, in order to reduce the considerable amount of friction which is exercised by the logs upon the movement of the chain.

The chain in Fig. 7 can, if desired, carry the peeling knives in each alternate chain member, A. Under this arrangement the knives are operated longitudinally of the upper surface of the log more in the shape of a spiral than when inserted in every member of the chain. The knives, 61, are tightened and held securely in place by a stop, or lug, 72, which is fastened to the knives, and by means of two screws, 80, arranged in the chain 81 passing through a plate, 73, said plate resting with its deflected part in the recess, 74, of one of the bolts, 75. The bolt is screwed into a nut, 79, which is shoved into one of the members of the chain, and ends in a four-cornered key, 76, extending upwardly. In this manner it is possible to adjust the knife in case it should become displaced by reason of its operation upon the log. In order to admit of the adjustment in a still greater amount, the plate, 73, is provided with three or more holes or sockets, $72^1$, with one of which, according to demand or necessity, the lug, 72, is brought into engagement, whereby the knife may be more or less deeply set. In order that the fastening screws, 80, which hold the knife to the plate may allow of this displacement, the screw holes are formed on the knife in the shape of longitudinal slots, 77. In order that in case of uneven logs, the knives may be adjusted to peel the logs completely, the upper part of the chain is guided in a grooved support, 81, so that the entire slack which is controlled by the hand wheel, 10, is transmitted to the lower part of the chain Under this construction it is possible to use the knives for a long period without being compelled to exchange or to re-sharpen the same, thus affording a continuous and uninterrupted operation for a considerable length of time. The individual hand wheels, as well as the other parts which are manipulated by hand, are arranged on the outer side, and near to each other in such manner that they can be operated by one person with ease, and without any danger.

Having thus fully described my invention, what I claim as new and desire to secure by Letters Patent is:

1. In a log peeling machine, the combination, with a frame, a log support mounted thereon, and means to adjust the support horizontally at an angle to the axis of the log, of cutters having a cutting edge extending transversely of the log, and means to cause relative movement of the cutters and log in a direction substantially parallel to the log axis.

2. In a log peeling machine, the combination, with a frame, a log support mounted thereon, means to adjust the support vertically, and means to adjust the same horizontally at an angle to the axis of the log, of cutters having a cutting edge extending transversely of the log, and means to cause relative movement of the cutters and log in a direction substantially parallel to the log axis.

3. In a log peeling machine, the combination, with a frame, log supporting members mounted thereon in horizontally arranged pairs, means to simultaneously adjust the members of each pair vertically, means to simultaneously adjust the members of each pair horizontally, and means to adjust the members of each pair horizontally relative to each other, of cutters having a cutting edge extending transversely of the log, and means to cause relative movement of the cutters and log in a direction substantially parallel to the log axis.

4. In a log peeling machine, the combination, with a frame, a plurality of toothed disks mounted thereon and arranged to support the log, means to simultaneously adjust said disks vertically, means to simultaneously adjust said disks horizontally, means to adjust the disks horizontally relative to each other, and means to rotate said disks, of knives, and means for moving the same in a general longitudinal direction over the surface of the log.

5. In a log peeling machine, the combination, with a frame, a bracket mounted at each end thereof and arranged to be moved horizontally, means carried by the brackets for supporting the log, a threaded nut formed in a projection having fixed relation to each bracket, a screw-stem engaging said nut and journaled in a fixed support, and means for rotating said stem whereby the brackets and the supported log are adjusted horizontally at an angle to the axis of the log, of cutters having a cutting edge extending transversely of the log, and means to cause relative movement of the cutters and log in a direction substantially parallel to the log axis.

6. In a log peeling machine, the combination, with a frame, a bracket mounted at each end thereof and adapted to be moved horizontally, shafts supported by said brackets, toothed disks carried by said shafts and arranged to support the log, a threaded nut formed in a projection having fixed relation to each bracket, a screw-stem engaging said nut and journaled in a fixed portion of the frame, means for rotating said stem whereby the toothed disks are moved horizontally, and means for rotating the shafts, of cutters having an edge extending transversely of the log, and means for drawing the same longitudinally over the log surface.

7. In a log peeling machine, the combination, with a frame, of shafts mounted thereon, toothed disks carried by the shafts and adapted to support the log, threaded nuts or sockets formed in the bearings of the shafts and having oppositely disposed threads, a screw spindle connecting the ends of the two bearings, and having oppositely disposed threads, and means for rotating said spindle whereby the distance between the two shafts will be varied, of a plurality of knives, and means for moving the same longitudinally of the surface of the log.

8. In a log peeling machine, the combination, with a frame, shafts mounted thereon, a plurality of toothed disks mounted upon each shaft, means for adjusting the shafts simultaneously and to the same extent in a vertical direction, means for adjusting the shafts simultaneously and to the same extent in a horizontal direction laterally, and means for rotating said shafts simultaneously to adjust the position of the log, of chain wheels mounted upon the frame, endless chains carried by said wheels, knives mounted in the members of the chain, and means for moving said chains longitudinally of the log with the knives in contact therewith.

In testimony whereof I affix my signature to this specification, in the presence of two witnesses.

JOHN MORAVEC.

Witnesses:
FRANK UNSWOTT,
JAS. M. SHEPARD.